(12) United States Patent
Ikenishi (10) Patent No.: US 12,374,061 B2
(45) Date of Patent: Jul. 29, 2025

(54) DISPLAY SYSTEM FOR DISPLAYING MIXED REALITY SPACE IMAGE AND PROCESSING METHOD FOR USE OF DISPLAY SYSTEM

(71) Applicant: CANON KABUSHIKI KAISHA, Tokyo (JP)

(72) Inventor: Shunsuke Ikenishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/334,064

(22) Filed: Jun. 13, 2023

(65) Prior Publication Data

US 2023/0410444 A1 Dec. 21, 2023

(30) Foreign Application Priority Data

Jun. 16, 2022 (JP) ................................ 2022-097330

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 2207/10012* (2013.01); *G06T 2207/20212* (2013.01); *G06T 2207/30244* (2013.01)

(58) Field of Classification Search
None
See application file for complete search history.

(56) References Cited

U.S. PATENT DOCUMENTS

| | | |
|---|---|---|
| 7,868,904 B2 | 1/2011 | Morita et al. |
| 10,699,472 B2 | 6/2020 | Yeoh et al. |
| 2016/0019720 A1* | 1/2016 | Thurber ............. G02B 27/0172 345/419 |
| 2022/0329772 A1 | 10/2022 | Otsuka |
| 2023/0343041 A1* | 10/2023 | Perlin ..................... E01C 9/002 |

FOREIGN PATENT DOCUMENTS

JP 2008299669 A 12/2008

* cited by examiner

*Primary Examiner* — Robert J Craddock
(74) *Attorney, Agent, or Firm* — Canon U.S.A., Inc., IP Division (57) ABSTRACT

A display system includes a processor and a memory coupled to the processor and storing instructions that, when executed by the processor, cause the processor to function as: a position-orientation acquisition unit that acquires a position and orientation of the image pickup apparatus based on a first frame of the real space image, a generation unit that generates a first frame of the virtual space image on the basis of the position and orientation of the image pickup apparatus based on the first frame of the real space image, a first image combining unit that combines a frame different from the first frame of the real space image with the first frame of the virtual space image, and a second image combining unit that combines the first frame of the real space image with the first frame of the virtual space image.

18 Claims, 7 Drawing Sheets

DISPLAY SYSTEM FOR DISPLAYING MIXED REALITY SPACE IMAGE AND PROCESSING METHOD FOR USE OF DISPLAY SYSTEM

BACKGROUND

Field

The present disclosure relates to a display system for displaying a mixed reality space image and a processing method for use of the display system.

Description of the Related Art

In recent years, a mixed reality (MR) system has been developed as a technology that seamlessly combines the real and virtual world in real time. According to the mixed reality system, an object can be displayed on the real world in a superimposed manner as a computer graphics (CG) image. Then, the object can be viewed from a free viewpoint.

The mixed reality system uses, as one of video image display apparatuses, a head-mounted display (hereafter referred to as an "HMD") in which an image pickup apparatus, such as a video camera, and a display are integrated. One type of HMD is a video see-through system. The system displays a virtual space image generated in accordance with the position and orientation of the HMD on a real space image captured by the image pickup apparatus mounted in the HMD in a superimposed manner. Examples of a virtual space image include a virtual object and character information generated using computer graphics (CG).

In the design process in the manufacturing industry, a group review meeting with many members is often held. For a review meeting using a mixed reality system, the system includes handheld information terminals, such as tablets, in addition to HMDs so that the members can experience a mixed reality space (a space that combines the virtual space and real space). The system simultaneously distributes a mixed reality space image seen by an HMD wearer to other HMDs and tablet screens to display the image. As a result, a plurality of members can simultaneously share the view of the HMD wearer and participate in the design and review.

When a virtual space image is generated, a delay occurs in displaying an image based on the current HMD position and orientation due to the calculation of the HMD position and orientation and the rendering of CG in accordance with the position and orientation. If the delay is long in MR, a user may feel unpleasant sensation due to the discrepancy between their own movement and the displayed image, which may cause motion sickness. For this reason, even if the amount of delay is different from that of the virtual space image, the real space image may be displayed with a minimized delay.

Japanese Patent Laid-Open No. 2008-299669 describes a technique to reacquire the position and orientation of the HMD after the virtual space image is generated, shift the generated virtual space image in accordance with the difference from the position and orientation used when the virtual space image is generated, and display the image. Thus, the delay of the virtual space image appears to be short.

However, when the mixed reality space image seen by an HMD wearer is distributed and displayed, the movement of the shared image does not reflect the movement of a viewer themself at the destination of the shared image. Therefore, the unpleasant sensation caused by the delay until the movement of the HMD wearer is reflected is small, and the unpleasant sensation is felt more that is caused by the difference in delay between the real space image and the virtual space image.

SUMMARY

Accordingly, the present disclosure provides a display system that displays a mixed reality space image with a small amount of delay of a real space image and a mixed reality space in which the amount of delay of the real space image is the same as that of the virtual space image.

According to an aspect of the present disclosure, a display system includes at least one processor and at least one memory coupled to the at least one processor and storing instructions that, when executed by the at least one processor, cause the at least one processor to function as: a position-orientation acquisition unit configured to acquire a position and orientation of an image pickup apparatus based on a captured real space image, a generation unit configured to generate a virtual space image based on the position and orientation, a first image combining unit configured to generate a first mixed reality space image obtained by combining the captured real space image with the generated virtual space image, and a second image combining unit configured generate a second mixed reality space image obtained by combining the captured real space image with the generated virtual space image, wherein the position-orientation acquisition unit acquires the position and orientation of the image pickup apparatus based on a first frame of the captured real space image, wherein the generation unit generates a first frame of the generated virtual space image based on the position and orientation of the image pickup apparatus in the first frame of the captured real space image, wherein the first image combining unit combines a frame different from the first frame of the captured real space image with the first frame of the generated virtual space image, and wherein the second image combining unit combines the first frame of the captured real space image with the first frame of the generated virtual space image.

Further features of the present disclosure will become apparent from the following description of exemplary embodiments with reference to the attached drawings.

DESCRIPTION OF THE EMBODIMENTS

First Embodiment

Figure 1:
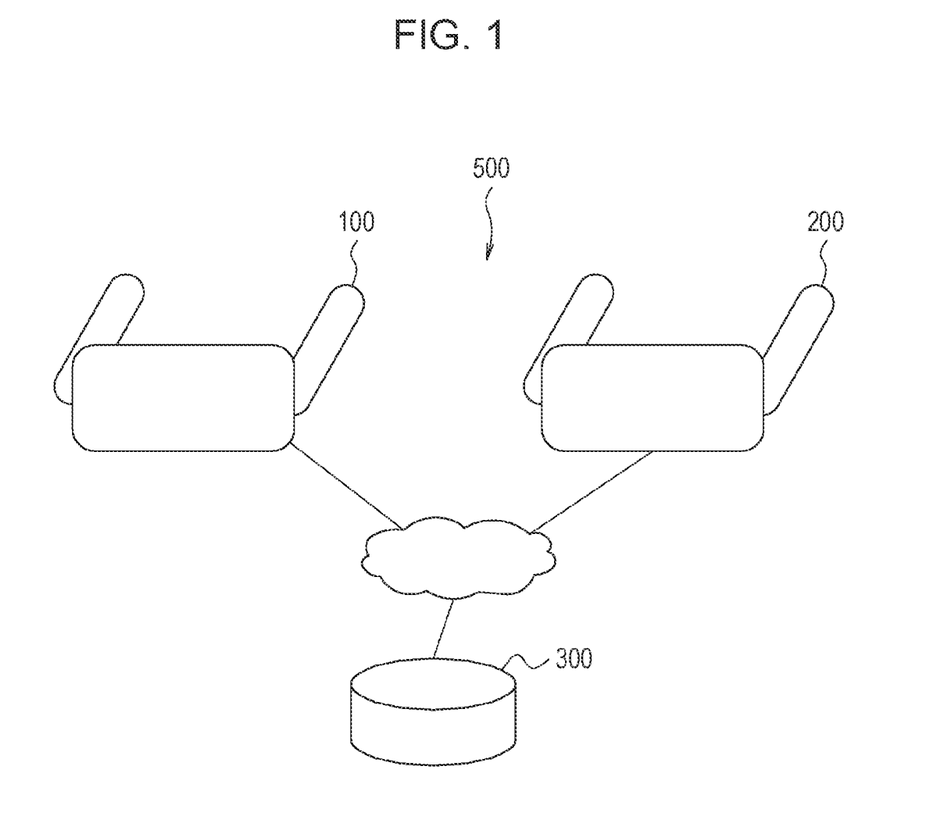
FIG. 1 illustrates a configuration example of a display system.

Embodiments are described in detail below with reference to the accompanying drawings. FIG. 1 illustrates a configuration example of a display system 500 according to the first embodiment. The display system 500 includes a head mounted display (HMD) 100, a display apparatus 200, and a computer graphics (CG) data management server 300. The HMD 100 is an example of a head mounted display apparatus and is a device that displays a mixed reality space image obtained by combining a real space image and a virtual space image right in front of the eyes of a user who wears the HMD 100 on the head. The CG data management server 300 is an apparatus that holds CG data necessary for constructing a virtual space. The HMD 100 and the display apparatus 200 access the CG data management server 300 via a network, acquire the CG data of the virtual reality space, generate a virtual reality space image, combine the generated image with the real space image, and display a virtual reality space image.

The HMD 100 and the display apparatus 200 can communicate with each other via the network. The HMD 100 can transfer a real space image captured by the HMD 100 and information for generating a virtual space to the display apparatus 200. The display apparatus 200 uses the transferred information to generate a mixed reality space image, so that the view of the wearer of the HMD 100 can be shared and displayed on the display apparatus 200.

The HMD 100 may be a system including a head-mounted portion separated from an image processing device, such as a personal computer (PC). Alternatively, the HMD 100 may be an apparatus that displays, on a display, a real space image captured while a device (for example, a smartphone) is being held by hand.

The display apparatus 200 may be an HMD or may be a terminal, such as a PC or a tablet, capable of combining a real space image with a virtual space image and displaying the combined image.

In addition, a plurality of display apparatuses 200 may be provided, and images from the HMD 100 may be shared by all the display apparatuses 200.

The HMD 100 and the display apparatus 200 may be located in the same space where the users of the HMD 100 and the display apparatus 200 can directly see each other or may be located far away from each other where the users of the HMD 100 and the display apparatus 200 cannot see each other directly. The CG data management server 300 may be integrated into the HMD 100.

According to the present embodiment, the HMD 100 captures a real space image and calculates the position and orientation of the HMD 100. Thereafter, the HMD 100 uses the CG data acquired from the CG data management server 300 and generates a virtual space image such that the virtual space image looks like an image viewed from the calculated position and orientation. Subsequently, the HMD 100 generates a mixed reality space image obtained by combining the captured real space image with the generated virtual space image. Then, the HMD 100 displays the generated mixed reality space image on a display unit of the HMD 100 and transmits the captured real space image and the position and orientation of the HMD 100 to the display apparatus 200.

The display apparatus 200 generates a virtual space image such that the image can be an image viewed from the received position and orientation of the HMD 100 by using the CG data acquired from the CG data management server 300. Thereafter, the display apparatus 200 combines the virtual space image with the received real space image. Thus, the HMD 100 and the display apparatus 200 can share the mixed reality space image.

Figure 2:
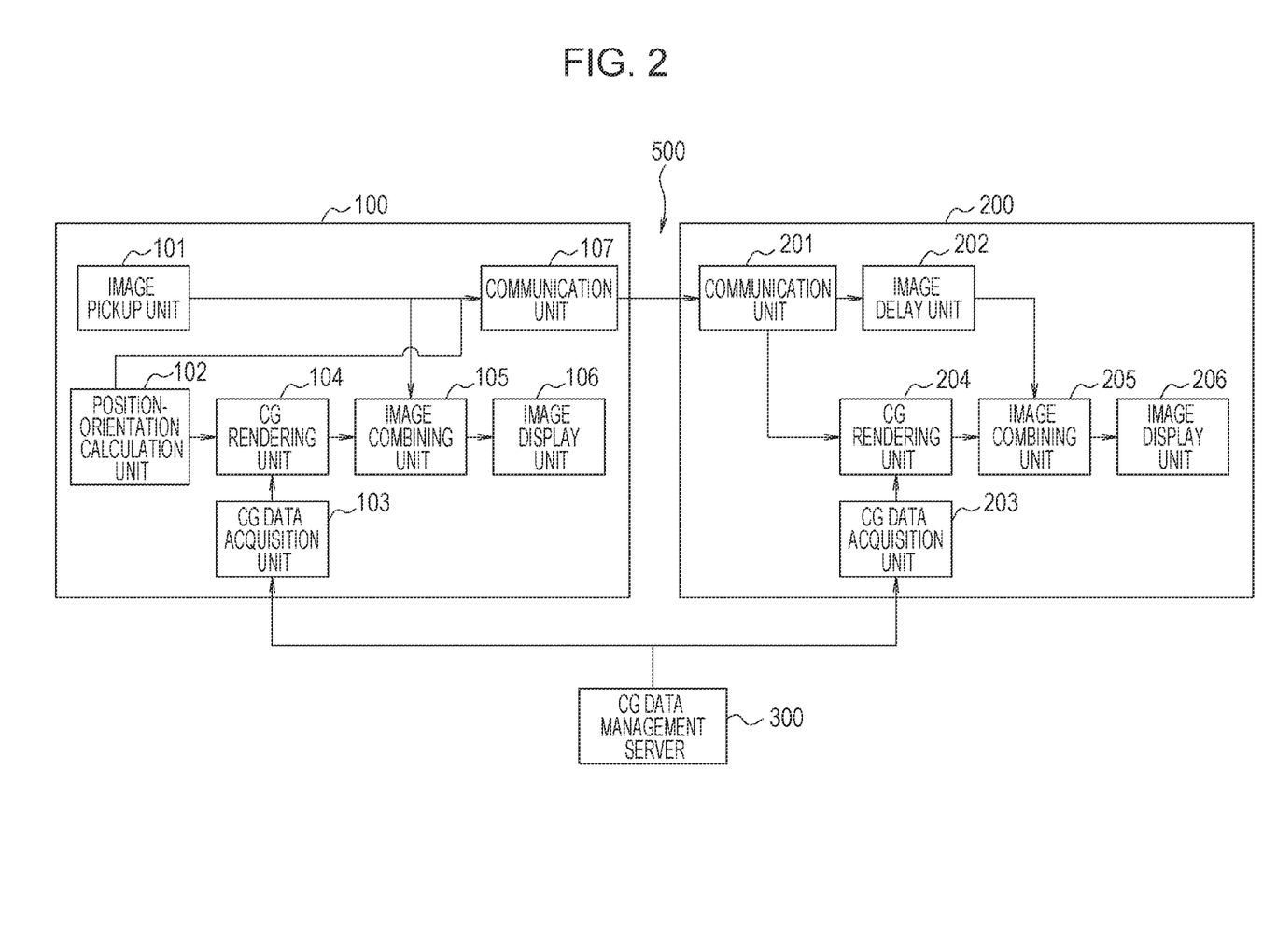
FIG. 2 is a block diagram of a functional configuration example of the display system.

FIG. 2 is a block diagram illustrating a functional configuration example of the display system 500. The display system 500 includes the HMD 100, the display apparatus 200, and the CG data management server 300.

The HMD 100 includes an image pickup unit 101, a position-orientation calculation unit 102, a CG data acquisition unit 103, a CG rendering unit 104, an image combining unit 105, an image display unit 106, and a communication unit 107.

The image pickup unit 101 captures a real space image by using a camera mounted in the HMD 100 on a frame-by-frame basis. The camera can capture images corresponding to the positions of the eyes of the wearer of the HMD 100 and can capture an image for the right eye and an image for the left eye. Note that the image and the position and orientation generated below are generated for each of the right eye and the left eye. The image pickup unit 101 captures the real space images for the right eye and the left eye.

The position-orientation calculation unit 102 calculates the position and orientation of the HMD 100 for each of the right eye and the left eye on a frame-by-frame basis. As used herein, the term "position and orientation" refers to a three-dimensional position and a three-dimensional orientation. A variety of techniques for calculating the position and orientation are known, and any one of the techniques may be used. According to the present embodiment, the position-orientation calculation unit 102 uses a technique called VISUAL SLAM to calculate the position and orientation for each of the right eye and the left eye from the right-eye and left-eye real space images captured by the image pickup unit 101 on a frame-by-frame basis. VISUAL SLAM is a technique that calculates the position and orientation of the camera by detecting characteristic points from the real space image and tracking time series changes in the points. The image pickup unit 101 may include a first image pickup unit and a second image pickup unit, the first image pickup unit may acquire images for the right eye and the left eye of the HMD 100, and the second image pickup unit may capture images used to obtain the position and orientation of the image pickup unit 101. In this case, the first image pickup unit may be a rolling shutter image pickup unit with a wide dynamic range for acquiring color images, and the second image pickup unit may be a global shutter image pickup unit with a narrow dynamic range for acquiring black-and-white images.

The CG data acquisition unit 103 acquires CG data for building a virtual space from the external CG data management server 300.

The CG rendering unit 104 receives the CG data acquired by the CG data acquisition unit 103. Thereafter, the CG rendering unit 104 renders the CG data for each frame using, as viewpoints, the positions and orientations for the right eye and the left eye calculated by the position-orientation calculation unit 102. Thus, the CG rendering unit 104 generates virtual space images for the right eye and the left eye. The field of view at the time of rendering is set to the field of view of the image captured by the image pickup unit 101.

The image combining unit 105 combines the real space images for the right eye and the left eye captured by the image pickup unit 101 with the virtual space images for the right eye and the left eye generated by the CG rendering unit 104, respectively, on a frame-by-frame basis. Thus, mixed reality space images for the right eye and the left eye are generated.

The image display unit 106 displays the right-eye and left-eye mixed reality space images generated by the image combining unit 105 on screens of the HMD 100 in front of the right eye and the left eye, respectively, on a frame-by-frame basis.

The communication unit 107 transmits the real space images for the right eye and the left eye captured by the image pickup unit 101 and the positions and orientations for the right eye and the left eye calculated by the position-orientation calculation unit 102 to the display apparatus 200 on a frame-by-frame basis. The HMD 100 is the shared source of an image, and the display apparatuses 200 share the image.

The display apparatus 200 includes a communication unit 201, an image delay unit 202, a CG data acquisition unit 203, a CG rendering unit 204, an image combining unit 205, and an image display unit 206.

The communication unit 201 receives the real space images for the right eye and the left eye and the positions and orientations for the right eye and the left eye transmitted from the HMD 100 on a frame-by-frame basis.

The image delay unit 202 buffers the real space images for the right eye and the left eye received by the communication unit 201 on a frame-by-frame basis and holds the frames of the real space images up to the present time. The image delay unit 202 can control the amount of delay of the real space image by selecting a frame of the real space image to be used for a combining process in accordance with the number of frames by which the image combining unit 205 (described below) wants to delay the image.

The CG data acquisition unit 203 acquires CG data for building the virtual space from the external CG data management server 300.

The CG rendering unit 204 renders the CG data acquired by the CG data acquisition unit 203 by using, as the viewpoints, the positions and orientations for the right eye and the left eye received by the communication unit 201 and generates virtual space images for the right eye and the left eye on a frame-by-frame basis. The field of view at the time of rendering is set to the field of view of the image captured by the image pickup unit 101 of the HMD 100.

The image combining unit 205 combines the real space images for the right eye and the left eye held by the image delay unit 202 with the virtual space images for the right eye and the left eye generated by the CG rendering unit 204, respectively, on a frame-by-frame basis. Thus, the image combining unit 205 generates mixed reality space images for the right eye and the left eye.

The image display unit 206 displays the mixed reality space images for the right eye and the left eye generated by the image combining unit 205 on the screens of the display apparatus 200 in front of the right eye and the left eye, respectively.

Figure 3:
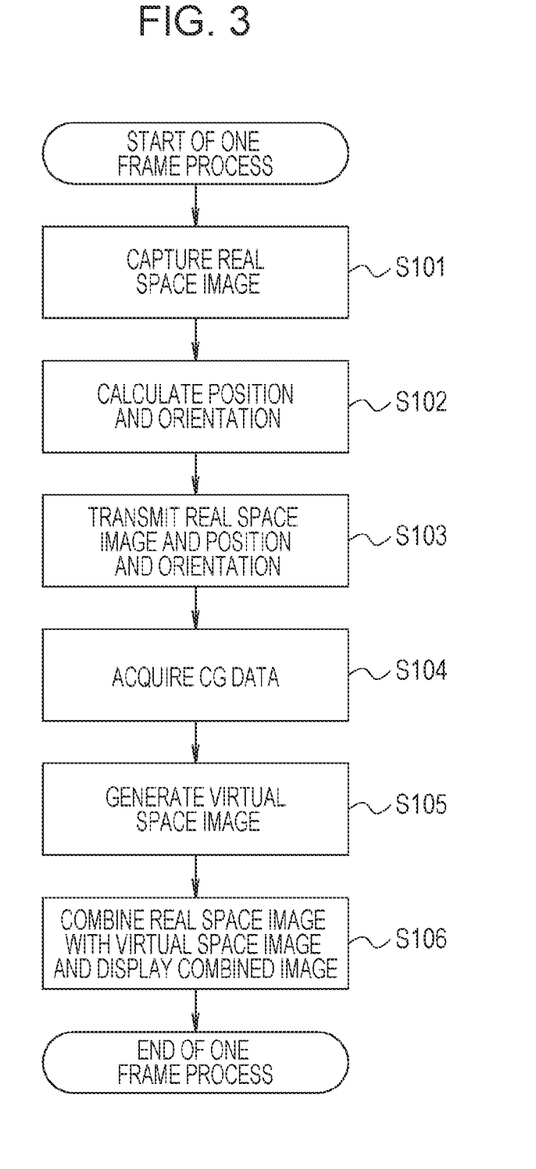
FIG. 3 is a flowchart of an example of the processing performed by an HMD.
Figure 4:
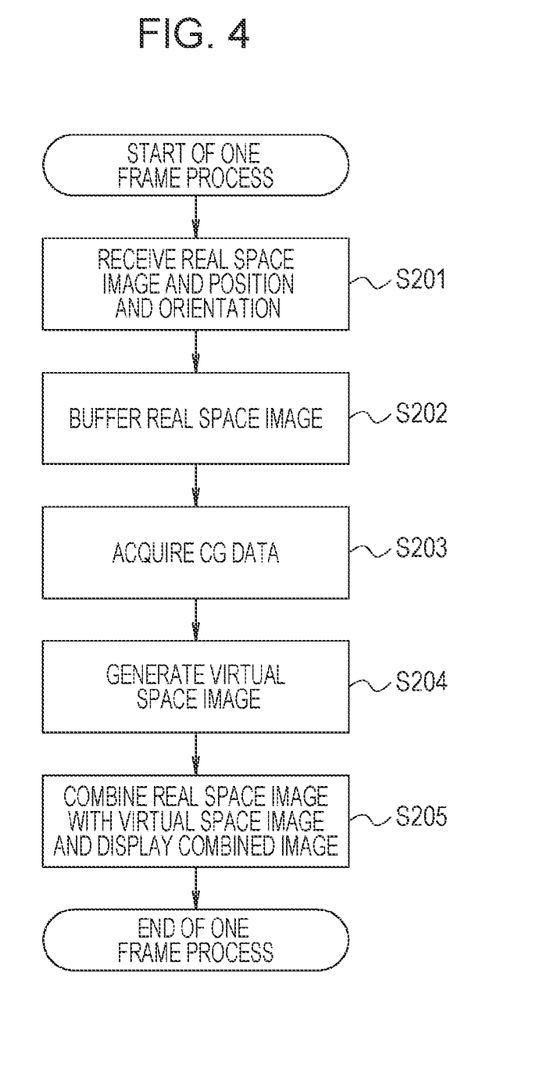
FIG. 4 is a flowchart of an example of the processing performed by the display apparatus.
Figure 5:
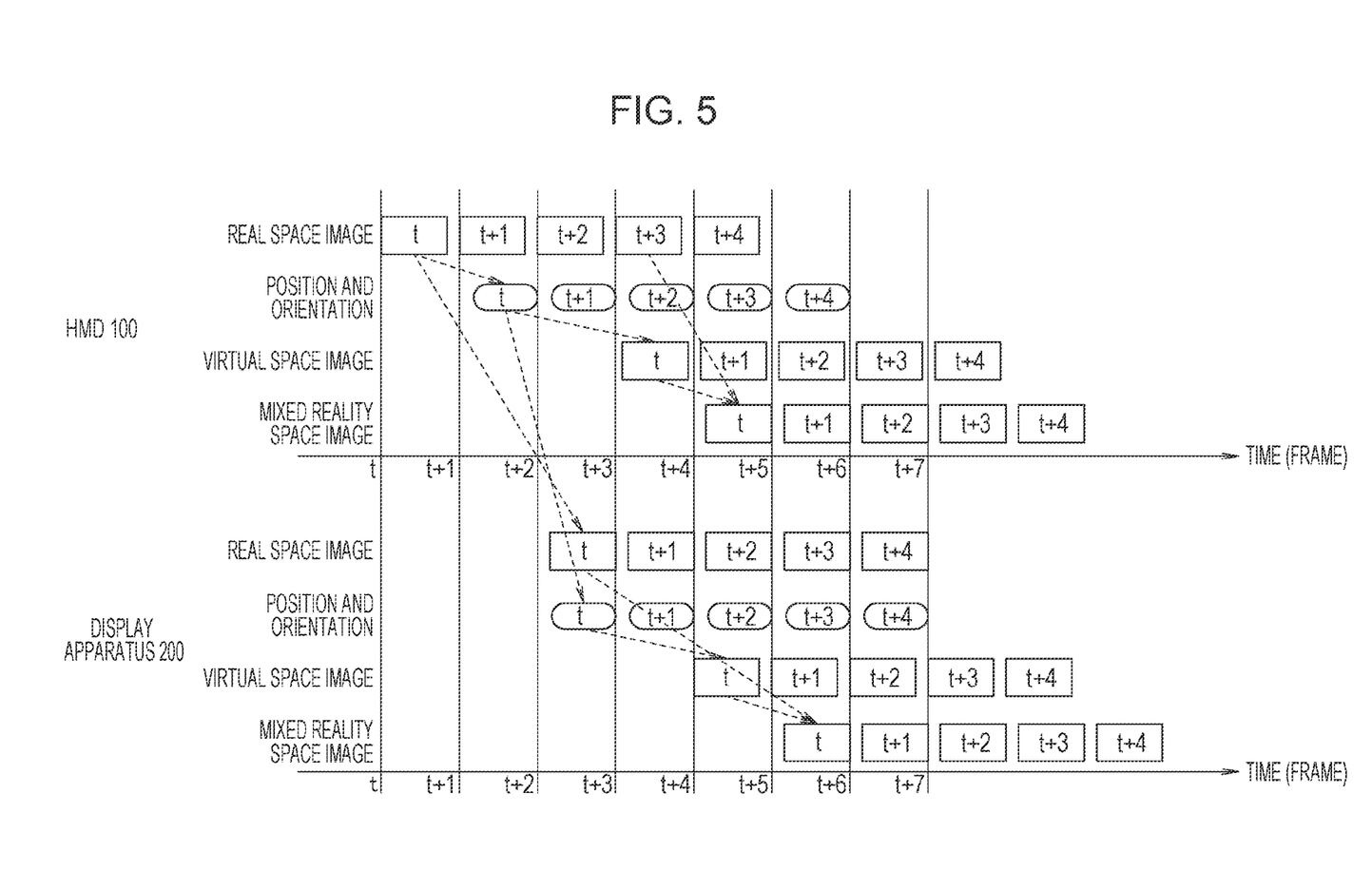
FIG. 5 is a diagram illustrating image delay.

FIG. 3 is a flowchart of the processing method for use of the HMD 100 and illustrates an example of the processing performed by the HMD 100 on each of frames. FIG. 4 is a flowchart of a processing method for use of the display apparatus 200 and illustrates an example of the processing performed by the display apparatus 200 on each of frames. FIG. 5 is a diagram illustrating a delay in each of stages of the processing performed by the HMD 100 and the display apparatus 200. The processing flows of the HMD 100 and the display apparatus 200 and the delay in each processing stage are described below with reference to the flowcharts illustrated in FIGS. 3 and 4. The HMD 100 starts the processing of the flowchart illustrated in FIG. 3 at a predetermined timing for each frame. The display apparatus 200 starts the processing of the flowchart illustrated in FIG. 4 at a predetermined timing for each frame.

As used herein, the term "delay" refers to the time from when the camera moves or a change in an object in the real space occurs to when the change is reflected in the image. In the case of a real space image, the delay is the time before a frame of captured image is displayed. In the case of a virtual space image, the delay is the time from the time of the calculated position and orientation to the time when the virtual space image that reflects the position and orientation is displayed.

The abscissa in FIG. 5 is the time (the frame). The upper section of FIG. 5 illustrates the real space image captured by the HMD 100, the position and orientation calculated by the HMD 100, the virtual space image generated by the HMD 100, and the mixed reality space image generated by the HMD 100. The lower section of FIG. 5 illustrates the real space image received by the display apparatus 200, the position and orientation received by the display apparatus 200, the virtual space image generated by the display apparatus 200, and the mixed reality space image generated by the display apparatus 200.

The times given in each of "real space image", "position and orientation", "virtual space image", and "mixed reality space image" of each of the HMD 100 and the display apparatus 200 are labels to indicate which data is generated based on which captured image frame. Note that for a mixed reality space image, data may be generated based on two captured image frames instead of one captured image frame. For example, as illustrated in FIG. 5, the mixed reality space image t of the HMD 100 is generated based on the captured image frame t+3 in addition to the captured image frame t. The arrows in FIG. 5 indicate such correspondence. For simplicity, the data is labeled with the time of only the earlier one of the two captured image frames (only "t") in FIG. 5.

Let ts be the time required for the HMD 100 to calculate the position and orientation from the real space image. Let tr be the time required for each of the CG rendering units 104 and 204 to perform rendering. Let tn be the time required to transmit the real space image and the position and orientation from the HMD 100 to the display apparatus 200. FIG. 5 illustrates an example when ts=1 frame, tr=2 frames, and tn=1 frame.

In step S101 illustrated in FIG. 3, the image pickup unit 101 captures real space images for the right eye and the left eye on a frame-by-frame basis. At time t in FIG. 5, a frame of the real space image for time t is captured.

In step S102, the position-orientation calculation unit 102 calculates the positions and orientations of the HMD 100 for the right eye and the left eye on the basis of the real space images for the right eye and the left eye captured by the image pickup unit 101 for the frame. For example, the position-orientation calculation unit 102 calculates the position and orientation for time t on the basis of the frame of the real space image for time t. Since time ts is required to calculate the positions and orientations, the positions and orientations for time t are calculated at time t+ts, where ts=1 frame.

In step S103, the communication unit 107 transmits the frame of the real space image for time t and the position and orientation for time t to the display apparatus 200. Time tn is required for the transmission. At time t+ts in FIG. 5, the communication unit 107 transmits the frame of the real space image for time t and the position and orientation for time t to the display apparatus 200. At time t+ts+tn, the communication unit 201 of the display apparatus 200 receives the frame of the real space image for time t and the position and orientation for time t, where tn=1 frame.

In step S104, the CG data acquisition unit 103 acquires CG data from the CG data management server 300.

In step S105, the CG rendering unit 104 renders the CG data acquired by the CG data acquisition unit 103 by using, as viewpoints, the positions and orientations for the right eye and the left eye calculated by the position-orientation calculation unit 102 for the frame. Thus, the CG rendering unit 104 generates virtual space images for the right eye and the left eye. For example, the CG rendering unit 104 renders the CG data by using the position and orientation for time t as a viewpoint and generates a virtual space image for time t. Since time tr is required for rendering, the frame of virtual space image for time t is generated at time t+ts+tr.

At this time, tr=2 frames.

In step S106, the image combining unit 105 combines the real space images for the right eye and the left eye captured by the image pickup unit 101 with the virtual space images for the right eye and the left eye generated by the CG rendering unit 104, respectively, for the frame. The image combining unit 105 generates mixed reality space images for the right eye and the left eye by combining for the frame. The image display unit 106 displays the mixed reality space images for the right eye and the left eye generated by the image combining unit 105 on the screens of the HMD 100 in front of the right eye and the left eye, respectively, for the frame.

For example, the image combining unit 105 combines the frame of the real space image for time t+3 with the frame of the virtual space image for time t and generates a frame of the mixed reality space image for time t. The image display unit 106 displays the frame of the mixed reality space image for time t on the screens of the HMD 100 in front of the right eye and the left eye.

At time t+ts+tr, the image pickup unit 101 captures a frame of the real space image for time t+3, and the CG rendering unit 104 generates a frame of the virtual space image for time t.

At time t+ts+tr+1, the image combining unit 105 combines the frame of the real space image for time t+3 with the frame of the virtual space image for time t and generates the frame of the mixed reality space image for time t. At this time, the image combining unit 105 combines the most recent frame of the real space image for time t+3 with the frame of the virtual space image for time tin order to reduce the delay of the real space image.

In step S201 illustrated in FIG. 4, the communication unit 201 receives the real space images for the right eye and the left eye and the positions and orientations for the right eye and the left eye from the HMD 100 on a frame-by-frame basis. At time t+ts+tn, the communication unit 201 receives the frame of the real space image for time t and the position and orientation for time t.

In step S202, the image delay unit 202 buffers the real space images for the right eye and the left eye received by the communication unit 201 for the frame and holds the frames of the real space images for the right eye and the left eye up to the present time.

In step S203, the CG data acquisition unit 203 acquires CG data from the CG data management server 300.

In step S204, the CG rendering unit 204 renders the CG data acquired by the CG data acquisition unit 203 by using, as the viewpoints, the positions and orientations for the right eye and the left eye received by the communication unit 201 and generates virtual space images for the right eye and the left eye for the frame. For example, the CG rendering unit 204 renders the CG data by using the position and orientation for time t as the viewpoint and generates a virtual space image for time t. Since time tr is required for rendering, the frame of the virtual space image for time t is generated at time t+ts+tr+tn.

In step S205, the image combining unit 205 combines the real space images for the right eye and the left eye held by the image delay unit 202 with the virtual space images for the right eye and the left eye generated by the CG rendering unit 204, respectively, for the frame. The image combining unit 205 generates mixed reality space images for the right eye and the left eye by combining for the frame. The image display unit 206 displays the mixed reality space images for the right eye and the left eye generated by the image combining unit 205 on the screens of the display apparatus 200 in front of the right eye and the left eye, respectively, for the frame.

At time t+ts+tr+tn, the image combining unit 205 combines the frame of the real space image for time t with the frame of the virtual space image for time t and generates a frame of the mixed reality space image for time t. The image display unit 206 displays the frames of the mixed reality space image for the time t on the screens of the display apparatus 200 in front of the right eye and the left eye.

The movement of the image displayed by the image display unit 206 does not reflect the motion of the viewer of the display apparatus 200. Therefore, the unpleasant sensation caused by the delay until the movement of the HMD wearer is reflected is small for the viewer of the display apparatus 200, and the unpleasant sensation caused by the difference in amount of delay between the real space image and the virtual space image is felt more. For this reason, the image combining unit 205 combines the frame of the real space image for time t with the frame of the virtual space image for time t. As a result, the image display unit 206 can display an image in which the amounts of delay of the real space image and the virtual space image are the same.

As described above, the image combining unit 105 of the HMD 100 combines the frame of the real space image for time t+3 with the frame of the virtual space image for time t and generates a frame of the mixed reality space image for time t. As a result, in the mixed reality space image in the HMD 100, the amount of delay of the real space image caused by the movement of the wearer of the HMD 100 can be reduced and, thus, the unpleasant sensation felt by the wearer of the HMD 100 can be reduced.

In addition, the image combining unit 205 of the display apparatus 200 combines the frame of the real space image for time t with the frame of the virtual space image for time t and generates a frame of the mixed reality space image for time t. As a result, the mixed reality space image on the display apparatus 200 is an image in which the frame of the real space image and the frame of the virtual space image have the same amount of delay. Thus, the unpleasant sensation felt by the viewer of the display apparatus 200 can be reduced.

In step S102, the position-orientation calculation unit 102 may estimate and calculate the position and orientation for time t+3 in consideration of the time until the image is displayed. In this case, in step S105, the CG rendering unit 104 renders the CG data by using the position and orientation for time t+3 as the viewpoint and generates a virtual space image for time t+3. Even in this case, the position-orientation calculation unit 102 also calculates the position and orientation for time tin step S102. Then, in step S103, the communication unit 107 transmits the position and orientation for time t to the display apparatus 200. Thus, the HMD 100 can generate a mixed reality space image that makes the amount of delay of the virtual space image appear to be small if the above-described estimation is correct. The display apparatus 200 can generate a mixed reality space image based on the position and orientation of the HMD 100 that is not based on future estimation.

In addition, at time t+3 in step S105, the CG rendering unit 104 generates a frame of the virtual space image for time t. Thereafter, the position-orientation calculation unit 102 may recalculate the position and orientation for the present time t+3. Subsequently, the CG rendering unit 104 transforms the frame of the virtual space image for time t on the basis of the difference between the position and orientation for time t and the position and orientation for time t+3 and generates the frame of the virtual space image for time t+3. In step S106, the image combining unit 105 combines the frame of the real space image for time t+3 with the frame of the virtual space image for time t+3. This enables the HMD 100 to generate a mixed reality space image that makes the amount of delay appear to be as small as reasonably achievable by transforming the virtual space image after the virtual space image is generated.

In addition, the image combining unit 205 may select a frame having a predetermined amount of delay among the frames of the real space image. Furthermore, the HMD 100 may add a timestamp to the real space image and the position and orientation on a frame-by-frame basis and transmit the real space image and the position and orientation to the display apparatus 200. In this case, the display apparatus 200 selects a frame of the real space image by using the frame of the real space image and the position and orientation that have the same timestamp, generates a frame of the virtual space image, and combine the frames of the real space image and virtual space image.

The display apparatus 200 may include a position-orientation calculation unit that calculates the position and orientation of the HMD 100 on the basis of the frame of the real space image received by the communication unit 201. In this case, the CG rendering unit 204 can generate a frame of the virtual space image on the basis of the calculated position and orientation.

As described above, the display system 500 includes the HMD 100 and the display apparatus 200. The HMD 100 is an image pickup apparatus that includes the image pickup unit 101, the position-orientation calculation unit 102, the CG data acquisition unit 103, the CG rendering unit 104, the image combining unit 105, the image display unit 106, and a communication unit 107.

The image pickup unit 101 captures a real space image. The position-orientation calculation unit 102 calculates the position and orientation of the HMD 100 on the basis of the above-described real space image. The CG rendering unit 104 is a generation unit that generates a first virtual space image on the basis of the position and orientation of the HMD 100. The image combining unit 105 generates a first mixed reality space image by combining the real space image captured by the image pickup unit 101 with the above-described first virtual space image. The image combining unit 105 displays the first mixed reality space image on the image display unit 106. The communication unit 107 transmits at least the real space image captured by the image pickup unit 101 to the display apparatus 200.

The position-orientation calculation unit 102 calculates the position and orientation of the HMD 100 on the basis of a first frame (for example, the frame for time t) of the above-described real space image. The CG rendering unit 104 generates a first frame of the first virtual space image on the basis of the position and orientation of the HMD 100 based on the first frame of the above-described real space image. The image combining unit 105 combines a frame different from the first frame of the above-described real space image (for example, the frame for time t+3) with the first frame of the above-described first virtual space image.

The display apparatus 200 includes the communication unit 201, the image delay unit 202, the CG data acquisition unit 203, the CG rendering unit 204, the image combining unit 205, and the image display unit 206. The communication unit 201 receives a real space image from the HMD 100. The CG rendering unit 204 is a generation unit. The CG rendering unit 204 generates a second virtual space image on the basis of the position and orientation of the HMD 100. The image combining unit 205 generates a second mixed reality space image by combining the real space image received by the communication unit 201 with the above-described second virtual space image. The image combining unit 205 displays the second mixed reality space image on the image display unit 206.

The CG rendering unit 204 generates the first frame of the second virtual space image on the basis of the position and orientation of the HMD 100 based on the first frame of the above-described real space image. The image combining unit 205 combines the above-described first frame of the real space image with the first frame of the above-described second virtual space image.

For example, the communication unit 107 transmits, to the display apparatus 200, the first frame of the real space image captured by the image pickup unit 101 and the position and orientation of the HMD 100 based on the first frame of the real space image. The communication unit 201 receives, from the HMD 100, the first frame of the real space image and the position and orientation of the HMD 100 based on the first frame of the real space image. The CG rendering unit 204 generates a first frame of the second virtual space image on the basis of the position and orientation of the HMD 100 based on the first frame of the real space image received by the communication unit 201.

The display apparatus 200 may include a second position-orientation calculation unit that calculates the position and orientation of the HMD 100 based on a first frame of the real space image on the basis of the first frame of the real space image received by the communication unit 201. In this case, the CG rendering unit 204 generates a first frame of the second virtual space image on the basis of the position and orientation of the HMD 100 based on the first frame of the real space image calculated by the second position-orientation calculation unit.

For example, the image combining unit 105 combines a second frame subsequent to the first frame of the real space image (for example, the frame for time t+3) with the above-described first frame of the first virtual space image. For example, the second frame of the real space image is the most recent frame of the real space image.

For example, the position-orientation calculation unit 102 calculates the position and orientation of the HMD 100 at the capture time of the first frame of the real space image on the basis of the first frame of the real space image. The CG rendering unit 104 generates a first frame of the first virtual space image on the basis of the position and orientation of the HMD 100 at the capture time of the first frame of the real space image. The CG rendering unit 204 generates a first frame of the second virtual space image on the basis of the position and orientation of the HMD 100 at the capture time of the first frame of the real space image.

The communication unit 107 transmits, to the display apparatus 200, the first frame of the real space image captured by the image pickup unit 101 and the position and orientation of the HMD 100 at the capture time of the first frame of the real space image. The communication unit 201 receives, from the HMD 100, the first frame of the real space image and the position and orientation of the HMD 100 at the capture time of the first frame of the real space image. The CG rendering unit 204 generates a first frame of the second virtual space image on the basis of the position and orientation of the HMD 100 at the capture time of the first frame of the real space image received by the communication unit 201.

As described above, the display apparatus 200 can include the second position-orientation calculation unit. In this case, the second position-orientation calculation unit calculates the position and orientation of the HMD 100 at the capture time of the first frame of the real space image on the basis of the first frame of the real space image received by the communication unit 201. The CG rendering unit 204 generates a first frame of the second virtual space image on the basis of the position and orientation of the HMD 100 at the capture time of the first frame of the real space image (the position and orientation calculated by the second position-orientation calculation unit).

As described above, the image combining unit 105 combines a second frame (for example, the frame for time t+3) subsequent to the first frame of the real space image with the first frame of the first virtual space image. The position-orientation calculation unit 102 estimates the position and orientation of the HMD 100 at the capture time of the second frame of the real space image on the basis of the first frame of the real space image. The CG rendering unit 104 generates a first frame of the first virtual space image on the basis of the position and orientation of the HMD 100 at the capture time of the second frame of the real space image. The CG rendering unit 204 generates a first frame of the second virtual space image on the basis of the position and orientation of the HMD 100 at the capture time of the first frame of the real space image.

More specifically, the position and orientation calculation unit 102 calculates the position and orientation of the HMD 100 at the capture time of the first frame of the real space image on the basis of the first frame of the real space image. Thereafter, the position-orientation calculation unit 102 estimates the position and orientation of the HMD 100 at the capture time of the second frame of the real space image on the basis of the first frame of the real space image. The CG rendering unit 104 generates a first frame of the first virtual space image on the basis of the position and orientation of the HMD 100 at the capture time of the second frame of the real space image. The communication unit 107 transmits, to the display apparatus 200, the first frame of the real space image captured by the image pickup unit 101 and the position and orientation of the HMD 100 at the capture time of the first frame of the real space image.

The communication unit 201 receives, from the HMD 100, the first frame of the real space image and the position and orientation of the HMD 100 at the capture time of the first frame of the real space image. The CG rendering unit 204 generates a first frame of the second virtual space image on the basis of the position and orientation of the HMD 100 at the capture time of the first frame of the real space image received by the communication unit 201.

As described above, the display apparatus 200 can include the second position-orientation calculation unit. In this case, the second position-orientation calculation unit calculates the position and orientation of the HMD 100 at the capture time of the first frame of the real space image on the basis of the first frame of the real space image received by the communication unit 201. The CG rendering unit 204 generates a first frame of the second virtual space image on the basis of the position and orientation of the HMD 100 at the capture time of the first frame of the real space image calculated by the second position-orientation calculation unit.

In addition, the image combining unit 105 combines the second frame (for example, the frame for time t+3) subsequent to the first frame of the real space image with the first frame of the first virtual space image. In this case, the position-orientation calculation unit 102 calculates the position and orientation of the HMD 100 at the capture time of the first frame of the real space image on the basis of the first frame of the real space image. The CG rendering unit 104 generates a candidate frame of the first virtual space image at the capture time of the first frame of the real space image on the basis of the position and orientation of the HMD 100 at the capture time of the first frame of the real space image. The position-orientation calculation unit 102 calculates the position and orientation of the HMD 100 at the capture time of the second frame of the real space image on the basis of the second frame of the real space image. The CG rendering unit 104 generates a first frame of the first virtual space image at the capture time of the second frame of the real space image on the basis of the difference between the position and posture of the HMD 100 at the capture time of the first frame of the real space image and the position and orientation of the HMD 100 at the capture time of the second frame of the real space image and the candidate frame of the first virtual space image.

In addition, the communication unit 107 transmits, to the display apparatus 200, the first frame of the real space image captured by the image pickup unit 101 and the position and orientation of the HMD 100 at the capture time of the first frame of the real space image. The communication unit 201 receives, from the HMD 100, the first frame of the real space image and the position and orientation of the HMD 100 at the capture time of the first frame of the real space image. The CG rendering unit 204 generates a first frame of the second virtual space image on the basis of the position and orientation of the HMD 100 at the capture time of the first frame of the real space image received by the communication unit 201.

As described above, the display apparatus 200 can include the second position-orientation calculation unit. In this case, the second position-orientation calculation unit calculates the position and orientation of the HMD 100 at the capture time of the first frame of the real space image on the basis of the first frame of the real space image received by the communication unit 201. The CG rendering unit 204 generates a first frame of the second virtual space image on the basis of the position and orientation of the HMD 100 at the capture time of the first frame of the real space image calculated by the second position-orientation calculation unit.

As described above, according to the present embodiment, the HMD 100 can reduce the amount of delay of a real space image of the mixed reality space image that the wearer of the HMD 100 views and, thus, the mixed reality space image having a small amount of delay of a real space image can be displayed. The display apparatus 200 can display a mixed reality space image in which the amount of delay of the real space image is the same as the amount of delay of the virtual space image.

Second Embodiment

The second embodiment is described below. According to the second embodiment, an example is described in which the HMD 100 generates a mixed reality space image having an amount of delay different from that of the mixed reality space image displayed on the image display unit 106 of the HMD 100 and transmits the mixed reality space image to the display apparatus 200. If the HMD 100 generates a mixed reality space image to be displayed on the display apparatus 200 in this manner, the display apparatus 200 can be an apparatus having a function of playing back and displaying an image of a widely used streaming format.

Only differences from the first embodiment are described below for the second embodiment. According to the second embodiment, the same configurations and the same steps as those of the first embodiment are identified by the same reference numerals as those described in the first embodiment.

Figure 6:
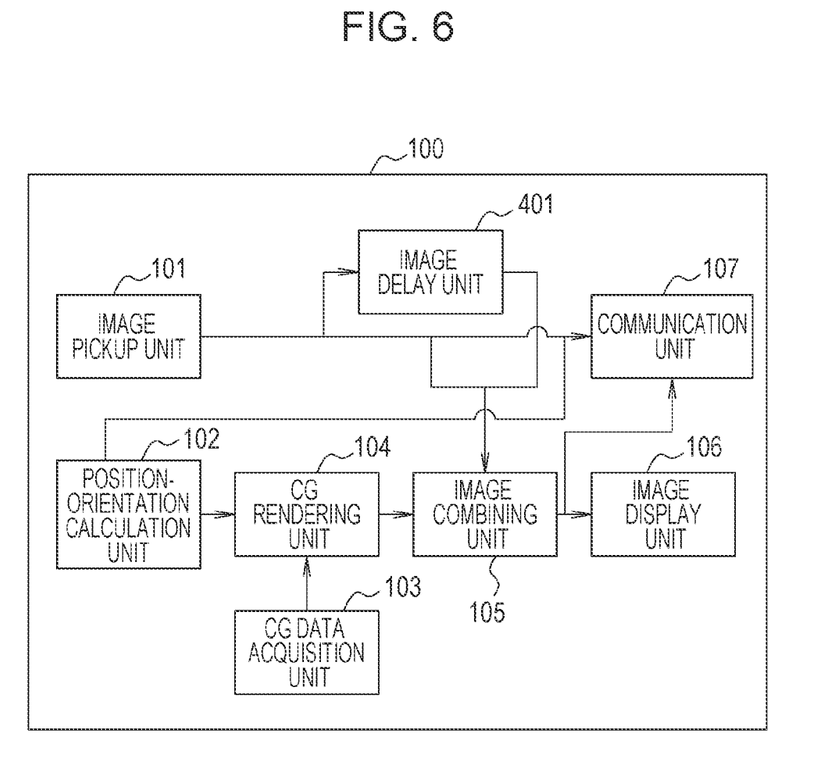
FIG. 6 is a block diagram of a functional configuration example of the HMD.

FIG. 6 is a block diagram of a functional configuration example of an HMD 100 according to the second embodiment. The HMD 100 illustrated in FIG. 6 is implemented by adding an image delay unit 401 to the HMD 100 illustrated in FIG. 2. The HMD 100 includes an image pickup unit 101, a position-orientation calculation unit 102, a CG data acquisition unit 103, a CG rendering unit 104, an image combining unit 105, an image display unit 106, a communication unit 107, and an image delay unit 401.

Figure 7:
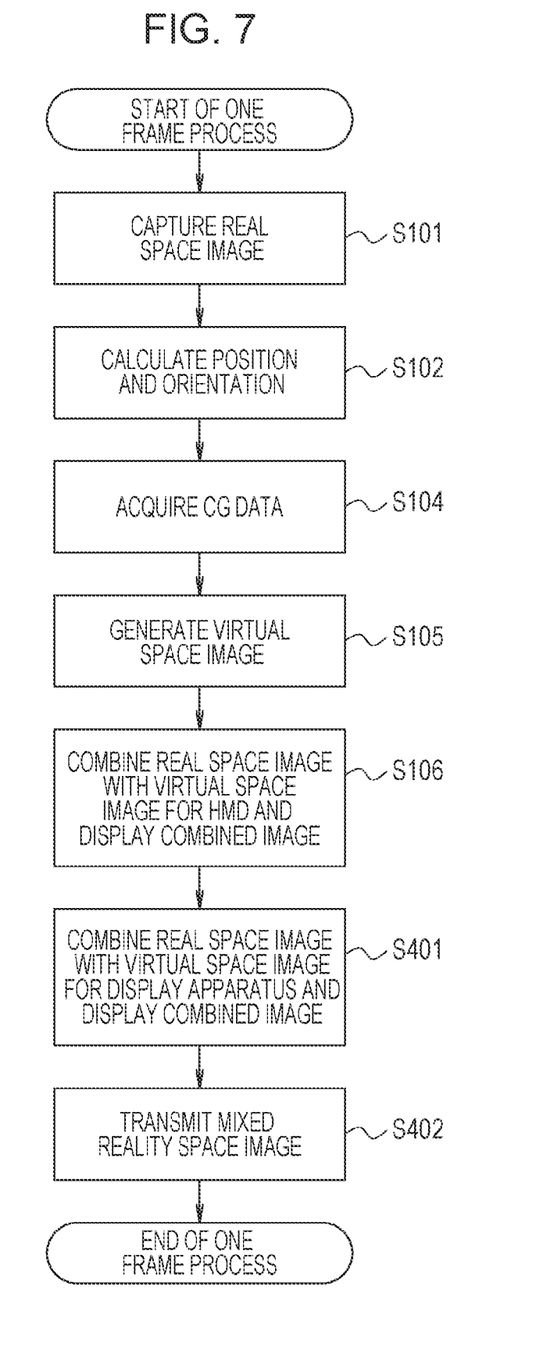
FIG. 7 is a flowchart illustrating an example of the processing performed by an HMD.

FIG. 7 is a flowchart of the processing method for use of the HMD 100 illustrated in FIG. 6. FIG. 7 illustrates an example of the processing performed by the HMD 100 on each of frames. The flowchart in FIG. 7 is obtained by deleting step S103 and adding steps S401 and S402 from and to the flowchart in FIG. 3. The HMD 100 starts the process of the flowchart illustrated in FIG. 7 at a predetermined timing for each frame. The HMD 100 performs processes in steps S101 and S102 and steps S104 to S106 in the same manner as in FIG. 3.

In step S101, the image delay unit 202 buffers real space images for the right eye and the left eye captured by the image pickup unit 101 on a frame-by-frame basis and holds the real space images for the right eye and the left eye up to the present time.

In step S106, the HMD 100 combines the most recent frame of the real space image for time t+3 with the frame of the virtual space image for time t and generates a mixed reality space image to be displayed on the HMD 100.

Thereafter, in step S401, the image combining unit 105 combines the real space images for the right eye and the left eye held by the image delay unit 401 with the virtual space images for the right eye and the left eye generated by the CG rendering unit 104, respectively, for the frame. The image combining unit 105 generates mixed reality space images for the right eye and the left eye by combining for the frame. More specifically, the image combining unit 105 combines the frame of the real space image for time t with the frame of the virtual space image for time t and generates a frame of the mixed reality space image for time t.

In step S402, the communication unit 107 transmits, to the display apparatus 200, the mixed reality space images for the right eye and the left eye generated in a widely used streaming format in step S401 for the frame.

In the display apparatus 200, the communication unit 201 receives the mixed reality space images for the right eye and the left eye from the HMD 100. The image display unit 206 displays the mixed reality space images for the right eye and the left eye received by the communication unit 201 on the screens of the display apparatus 200 in front of the right eye and the left eye.

As described above, the HMD 100 generates mixed reality space images to be displayed in the HMD 100 and mixed reality space images to be displayed in the display apparatus 200.

The HMD 100 displays the frame of the mixed reality space image obtained by combining the frame of the real space image for time t+3 with the frame of the virtual space image for time t. As a result, the mixed reality space image displayed by the HMD 100 can reduce the amount of delay of the real space image due to the movement of the wearer of the HMD 100 and, thus, reduce the unpleasant sensation felt by the wearer of the HMD 100.

In addition, the display apparatus 200 displays the frame of the mixed reality space image obtained by combining the frame of the real space image for time t with the frame of the virtual space image for time t. As a result, the mixed reality space image displayed in the display apparatus 200 is an image in which the frame of the real space image and the frame of the virtual space image have the same amount of delay and can reduce the unpleasant sensation felt by the viewer of the display apparatus 200.

As described above, the HMD 100 is an image pickup apparatus that includes the image pickup unit 101, the position-orientation calculation unit 102, the CG data acquisition unit 103, the CG rendering unit 104, the image combining unit 105, and the image display unit 106, the communication unit 107, and the image delay unit 401.

The image pickup unit 101 captures a real space image. The position-orientation calculation unit 102 calculates the position and orientation of the HMD 100 on the basis of the real space image. The CG rendering unit 104 generates a virtual space image on the basis of the position and orientation of the HMD 100. The image combining unit 105 generates a mixed reality space image by combining the real space image captured by the image pickup unit 101 with the virtual space image generated by the CG rendering unit 104. The communication unit 107 transmits the mixed reality space image to the display apparatus 200.

The position-orientation calculation unit 102 calculates the position and orientation of the HMD 100 based on a first frame (for example, the frame for time t) of the real space image. The CG rendering unit 104 generates a first frame of the virtual space image on the basis of the position and orientation of the HMD 100 based on the first frame of the real space image. The image combining unit 105 combines a frame different from the first frame of the real space image (for example, the frame for time t+3) with the first frame of the virtual space image and generates a first frame of a first mixed reality space image. Then, the image combining unit 105 displays the first frame of the first mixed reality space image on the image display unit 106.

In addition, the image combining unit 105 combines the first frame of the real space image with the first frame of the virtual space image and generates a first frame of a second mixed reality space image. The communication unit 107 transmits the first frame of the second mixed reality space image to the display apparatus 200.

More specifically, the image combining unit 105 combines a second frame subsequent to the first frame of the real space image (for example, the frame for time t+3) with the first frame of the first virtual space image and generates a first frame of the first mixed reality space image. The above-described second frame of the real space image is, for example, the most recent frame of the real space image.

The position-orientation calculation unit 102 calculates the position and orientation of the HMD 100 at the capture time of the first frame of the real space image on the basis of the first frame of the real space image. The CG rendering unit 104 generates a first frame of the virtual space image on the basis of the position and orientation of the HMD 100 at the capture time of the first frame of the real space image.

The position-orientation calculation unit 102 can estimate the position and orientation of the HMD 100 at the capture time of the second frame of the real space image on the basis of the first frame of the real space image. In this case, the CG rendering unit 104 generates a first frame of the first virtual space image based on the position and orientation of the HMD 100 at the capture time of the second frame of the real space image. The image combining unit 105 combines the second frame of the real space image with the first frame of the first virtual space image and generates a first frame of the first mixed reality space image. The CG rendering unit 104 generates a first frame of the second virtual space image on the basis of the position and orientation of the HMD 100 at the capture time of the first frame of the real space image. The image combining unit 105 combines the first frame of the real space image with the first frame of the second virtual space image and generates a first frame of the second mixed reality space image.

In addition, the position-orientation calculation unit 102 can calculate the position and orientation of the HMD 100 at the capture time of the first frame of the real space image on the basis of the first frame of the real space image. The CG rendering unit 104 generates a candidate frame of the first virtual space image at the capture time of the first frame of the real space image on the basis of the position and orientation of the HMD 100 at the capture time of the first frame of the real space image. The position-orientation calculation unit 102 calculates the position and orientation of the HMD 100 at the capture time of the second frame of the real space image on the basis of the second frame of the real space image. The CG rendering unit 104 generates a first frame of the first virtual space image at the capture time of the second frame of the real space image on the basis of the difference between the position and orientation of the HMD 100 at the capture time of the first frame of the real space image and the position and orientation of the HMD 100 at the capture time of the second frame of the real space image and the above-described candidate frame of the first virtual space image.

As described above, according to the present embodiment, the HMD 100 can reduce the amount of delay of a real space image of the mixed reality space image that the wearer of the HMD 100 views and, thus, the mixed reality space image having a small amount of delay of a real space image can be displayed. The display apparatus 200 can display a mixed reality space image in which the amount of delay of the real space image is the same as the amount of delay of the virtual space image.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-097330 filed Jun. 16, 2022, which is hereby incorporated by reference herein in its entirety.

What is claimed is:

1. A display system comprising:
at least one processor and at least one memory coupled to the at least one processor and storing instructions that, when executed by the at least one processor, cause the at least one processor to function as:
a position-orientation acquisition unit configured to acquire a position and orientation of an image pickup apparatus based on a captured real space image;
a generation unit configured to generate a virtual space image based on the position and orientation;
a first image combining unit configured to generate a first mixed reality space image obtained by combining the captured real space image with the generated virtual space image; and
a second image combining unit configured generate a second mixed reality space image obtained by combining the captured real space image with the generated virtual space image,
wherein the position-orientation acquisition unit acquires the position and orientation of the image pickup apparatus based on a first frame of the captured real space image,
wherein the generation unit generates a first frame of the generated virtual space image based on the position and orientation of the image pickup apparatus in the first frame of the captured real space image,
wherein the first image combining unit combines a frame different from the first frame of the captured real space image with the first frame of the generated virtual space image, and
wherein the second image combining unit combines the first frame of the captured real space image with the first frame of the generated virtual space image.

2. The display system according to claim 1,
wherein the system includes an image pickup apparatus including an image pickup unit configured to capture the captured real space image and a display unit and a display apparatus,
wherein the image pickup apparatus includes a first position-orientation acquisition unit configured to acquire the position and orientation of the image pickup apparatus on a basis of the real space image,
a first generation unit configured to generate a first virtual space image on a basis of the position and orientation of the image pickup apparatus,
the first image combining unit configured to generate a first mixed reality space image by combining the real space image with the first virtual space image and display the first mixed reality space image, and
a first communication unit configured to transmit at least the real space image to the display apparatus,
wherein the first position-orientation acquisition unit acquires the position and orientation of the image pickup apparatus based on the first frame of the real space image,
wherein the first generation unit generates a first frame of the first virtual space image on the basis of the position and orientation of the image pickup apparatus based on the first frame of the real space image, and
wherein the first image combining unit combines the frame different from the first frame of the real space image with the first frame of the first virtual space image.

3. The display system according to claim 2, wherein the display apparatus includes
a second communication unit configured to receive the captured real space image from the image pickup apparatus,
a second generation unit configured to generate a second virtual space image based on the position and orientation of the image pickup apparatus, and
the second image combining unit configured to generate a second mixed reality space image by combining the captured real space image received with the generated second virtual space image and display the second mixed reality space image,
wherein the second generation unit generates a first frame of the second virtual space image based on the position and orientation of the image pickup apparatus based on the first frame of the real space image, and
wherein the second image combining unit combines the first frame of the captured real space image with the first frame of the generated second virtual space image.

4. The display system according to claim 3, wherein the first communication unit transmits, to the display apparatus, the first frame of the captured real space image and the position and orientation of the image pickup apparatus based on the first frame of the captured real space image,
wherein the second communication unit receives, from the image pickup apparatus, the first frame of the captured real space image and the position and orientation of the image pickup apparatus based on the first frame or the captured real space image, and
wherein the second generation unit generates a first frame of the second virtual space image based on the position and orientation of the image pickup apparatus in the first frame of the real space image received by the second communication unit.

5. The display system according to claim 4, wherein the first position-orientation acquisition unit acquires the position and orientation of the image pickup apparatus at a capture time of the first frame of the real space image based on the first frame of the real space image,
wherein the first generation unit generates the first frame of the first virtual space image based on the position and orientation of the image pickup apparatus at a capture time of the first frame of the real space image,
wherein the first communication unit transmits, to the display apparatus, the first frame of the captured real space image and the position and orientation of the image pickup apparatus at a capture time of the first frame of the captured real space image,
wherein the second communication unit receives, from the image pickup apparatus, the first frame of the captured real space image and the position and orientation of the image pickup apparatus at a capture time of the first frame of the real space image, and
wherein the second generation unit generates a first frame of the second virtual space image based on the position and orientation of the image pickup apparatus at a capture time of the received first frame of the captured real space image.

6. The display system according to claim 3, wherein the display apparatus includes a second position-orientation acquisition unit configured to acquire the position and orientation of the image pickup apparatus based on the first frame of the captured real space image of the first frame of the real space image received by the second communication unit, and
wherein the second generation unit generates a first frame of the second virtual space image based on the position and orientation of the image pickup apparatus in the first frame of the captured real space image acquired by the second position-orientation acquisition unit.

7. The display system according to claim 6, wherein the first position-orientation acquisition unit acquires the position and orientation of the image pickup apparatus at a capture time of the first frame of the real space image based on the first frame of the real space image,
wherein the first generation unit generates the first frame of the first virtual space image based on the position and orientation of the image pickup apparatus at a capture time of the first frame of the captured real space image,
wherein the second position-orientation acquisition unit acquires the position and orientation of the image pickup apparatus at a capture time of the first frame of the real space image based on the received first frame of the real space image, and
wherein the second generation unit generates the first frame of the second virtual space image based on the position and orientation of the image pickup apparatus at a capture time of the acquired first frame of the captured real space image.

8. The display system according to claim 3, wherein the first position-orientation acquisition unit acquires the position and orientation of the image pickup apparatus at a capture time of the first frame of the real space image,
wherein the first generation unit generates the first frame of the first virtual space image based on the position and orientation of the image pickup apparatus at a capture time of the first frame of the real space image, and
wherein the second generation unit generates a first frame of the second virtual space image based on the position and orientation of the image pickup apparatus at a capture time of the first frame of the real space image.

9. The display system according to claim 3, wherein the first image combining unit combines a second frame subsequent to the first frame of the captured real space image with the first frame of the generated first virtual space image,
  wherein the first position-orientation acquisition unit estimates the position and orientation of the image pickup apparatus at a capture time of the second frame of the real space image based on the first frame of the captured real space image,
  wherein the first generation unit generates the first frame of the first virtual space image based on the position and orientation of the image pickup apparatus at a capture time of the second frame of the real space image, and
  wherein the second generation unit generates the first frame of the second virtual space image based on the position and orientation of the image pickup apparatus at a capture time of the first frame of the real space image.

10. The display system according to claim 9, wherein the first position-orientation acquisition unit acquires the position and orientation of the image pickup apparatus at a capture time of the first frame of the captured real space image and estimates the position and orientation of the image pickup apparatus at a capture time of the second frame of the real space image,
  wherein the first generation unit generates the first frame of the first virtual space image based on the position and orientation of the image pickup apparatus at a capture time of the second frame of the real space image,
  wherein the first communication unit transmits, to the display apparatus, the first frame of the captured real space image and the position and orientation of the image pickup apparatus at a capture time of the first frame of the captured real space image,
  wherein the second communication unit receives, from the image pickup apparatus, the first frame of the real space image and the position and orientation of the image pickup apparatus at a capture time of the first frame of the capture real space image, and
  wherein the second generation unit generates the first frame of the second virtual space image based on the position and orientation of the image pickup apparatus at a capture time of the received first frame of the captured real space image.

11. The display system according to claim 9, wherein the display apparatus includes a second position-orientation acquisition unit configured to acquire the position and orientation of the image pickup apparatus at a capture time of the first frame of the real space image based on the first frame of the real space image received by the second communication unit, and
  wherein the second generation unit generates the first frame of the second virtual space image based on the position and orientation of the image pickup apparatus at a capture time of the first frame of the real space image acquired by the second position-orientation acquisition unit.

12. The display system according to claim 3, wherein the first image combining unit combines a second frame subsequent to the first frame of the real space image with the first frame of the first virtual space image,
  wherein the first position-orientation acquisition unit acquires the position and orientation of the image pickup apparatus at a capture time of the first frame of the real space image based on the first frame of the real space image,
  wherein the first generation unit generates a candidate frame of the first virtual space image at a capture time of the first frame of the real space image based on the position and orientation of the image pickup apparatus at the capture time of the first frame of the captured real space image,
  wherein the first position-orientation acquisition unit acquires the position and orientation of the image pickup apparatus at a capture time of the second frame of the captured real space image based on the second frame of the real space image, and
  wherein the first generation unit generates the first frame of the first virtual space image at a capture time of the second frame of the captured real space image based on a difference between the position and orientation of the image pickup apparatus at a capture time of the first frame of the captured real space image and the position and orientation of the image pickup apparatus at a capture time of the second frame of the captured real space image and the candidate frame of the first virtual space image.

13. The display system according to claim 12, wherein the first communication unit transmits, to the display apparatus, the first frame of the real space image captured by the image pickup unit and the position and orientation of the image pickup apparatus at a capture time of the first frame of the captured real space image,
  wherein the second communication unit receives, from the image pickup apparatus, the first frame of the captured real space image and the position and orientation of the image pickup apparatus at a capture time of the first frame of the real space image, and
  wherein the second generation unit generates the first frame of the second virtual space image based on a basis of the position and orientation of the image pickup apparatus at a capture time of the first frame of the captured real space image received by the second communication unit.

14. The display system according to claim 12, wherein the display apparatus includes a second position-orientation acquisition unit configured to acquire the position and orientation of the image pickup apparatus at a capture time of the first frame of the captured real space image based on the first frame of the real space image received by the second communication unit, and
  wherein the second generation unit generates the first frame of the second virtual space image based on the position and orientation of the image pickup apparatus at a capture time of the acquired first frame of the captured real space image.

15. The display system according to claim 1, wherein the first image combining unit combines a second frame subsequent to the first frame of the captured real space image with the first frame of the virtual space image.

16. The display system according to claim 15, wherein the second frame of the real space image is the most recent frame of the real space image.

17. A processing method for use of a display system, the method comprising:
  acquiring a position and orientation of an image pickup apparatus on a basis of a real space image;
  generating a virtual space image on a basis of the position and orientation;
  generating a first mixed reality space image obtained by combining the real space image with the virtual space image; and generating a second mixed reality space image obtained by combining the real space image with the virtual space image, wherein in acquiring a position and orientation of the image pickup apparatus, the position and orientation of the image pickup apparatus based on the first frame of the real space image is acquired, wherein in generating a virtual space image, a first frame of the virtual space image is generated on a basis of the position and orientation of the image pickup apparatus based on the first frame of the real space image, wherein in displaying a first mixed reality space image on the display unit, a frame different from the first frame of the real space image is combined with the first frame of the virtual space image, and wherein in displaying a second mixed reality space image on the display apparatus, the first frame of the real space image is combined with the first frame of the virtual space image.

18. A non-transitory computer-readable storage medium storing instructions that, when executed by a processor performs a method for use of a display system, the method comprising:

acquiring a position and orientation of an image pickup apparatus on a basis of a real space image;

generating a virtual space image on a basis of the position and orientation;

generating a first mixed reality space image obtained by combining the real space image with the virtual space image; and generating a second mixed reality space image obtained by combining the real space image with the virtual space image, wherein in acquiring a position and orientation of the image pickup apparatus, the position and orientation of the image pickup apparatus based on the first frame of the real space image is acquired, wherein in generating a virtual space image, a first frame of the virtual space image is generated on a basis of the position and orientation of the image pickup apparatus based on the first frame of the real space image, wherein in displaying a first mixed reality space image on the display unit, a frame different from the first frame of the real space image is combined with the first frame of the virtual space image, and wherein in displaying a second mixed reality space image on the display apparatus, the first frame of the real space image is combined with the first frame of the virtual space image.

\* \* \* \* \*